United States Patent
Lee et al.

(10) Patent No.: US 9,331,835 B1
(45) Date of Patent: May 3, 2016

(54) RADIO FREQUENCY (RF) FRONT-END CIRCUITRY FOR WIRELESS LOCAL AREA NETWORK (WLAN), WIDE AREA NETWORK (WAN) AND GLOBAL POSITIONING SYSTEM (GPS) COMMUNICATIONS

(71) Applicant: AMAZON TECHNOLOGIES, INC., Reno, NV (US)

(72) Inventors: Tzung-i Lee, San Jose, CA (US); Varadarajan Gopalakrishnan, Cupertino, CA (US); Cheol Su Kim, San Jose, CA (US); In Chul Hyun, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 149 days.

(21) Appl. No.: 14/220,017

(22) Filed: Mar. 19, 2014

(51) Int. Cl.
*H04L 5/00* (2006.01)
*H04L 5/08* (2006.01)
*H04W 88/06* (2009.01)

(52) U.S. Cl.
CPC *H04L 5/08* (2013.01); *H04W 88/06* (2013.01)

(58) Field of Classification Search
CPC .......................... H04L 5/0098; H04L 27/0014
USPC ................... 370/297; 375/219, 371; 455/574
See application file for complete search history.

(56) References Cited

U.S. PATENT DOCUMENTS

| | | | | |
|---|---|---|---|---|
| 2008/0204327 | A1* | 8/2008 | Lee | H01Q 1/38 343/700 MS |
| 2009/0254339 | A1* | 10/2009 | Seguin | H03G 9/025 704/212 |
| 2009/0285135 | A1* | 11/2009 | Rousu | H04B 1/0057 370/297 |
| 2009/0286569 | A1* | 11/2009 | Rousu | H01P 1/213 455/553.1 |
| 2010/0282953 | A1* | 11/2010 | Tam | G01J 1/1626 250/226 |
| 2011/0053523 | A1* | 3/2011 | Yeh | H04B 1/406 455/73 |
| 2011/0116423 | A1* | 5/2011 | Rousu | H01Q 1/242 370/297 |
| 2012/0171977 | A1* | 7/2012 | Talty | H04B 7/0604 455/205 |
| 2012/0177161 | A1* | 7/2012 | Husted | G01S 19/235 375/371 |
| 2013/0125004 | A1* | 5/2013 | Zheng | G06F 3/048 715/736 |
| 2014/0269650 | A1* | 9/2014 | Sahota | H04W 84/12 370/338 |
| 2014/0269853 | A1* | 9/2014 | Gudem | H04L 5/0098 375/219 |
| 2014/0274225 | A1* | 9/2014 | Lacatus | H04W 24/08 455/574 |

OTHER PUBLICATIONS

4G Americas, MIMO and Smart Antennas for Mobile Broadband Systems. Oct. 2012. 138 pages.
Bahl, Paramvir et al., Reconsidering Wireless Systems with Multiple Radios. ACM SIGCOMM Computer Communications Review vol. 34, No. 5: Oct. 2004. 8 pages.

* cited by examiner

*Primary Examiner* — Wanda Z Russell
(74) *Attorney, Agent, or Firm* — Lowenstein Sandler LLP

(57) ABSTRACT

Radio frequency (RF) front-end circuitry and methods of operating the same are described. One apparatus includes multiple antennas and a RF front-end circuitry. The RF front-end circuitry includes: a selection switch coupled to a second antenna, a first RF transceiver coupled to a first antenna and selectively coupled to the second antenna via the selection switch; a second RF receiver coupled to the first antenna; and a third RF transceiver selectively coupled to the second antenna via the selection switch. The first antenna receives signals for the first RF transceiver and the second RF receiver. The selection switch selectively couples the second antenna to the first RF transceiver in a first mode of the RF front-end circuitry and selectively couples the second antenna to the third RF transceiver in a second mode of the RF front-end circuitry.

15 Claims, 10 Drawing Sheets

… (1)

RADIO FREQUENCY (RF) FRONT-END CIRCUITRY FOR WIRELESS LOCAL AREA NETWORK (WLAN), WIDE AREA NETWORK (WAN) AND GLOBAL POSITIONING SYSTEM (GPS) COMMUNICATIONS

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF THE DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
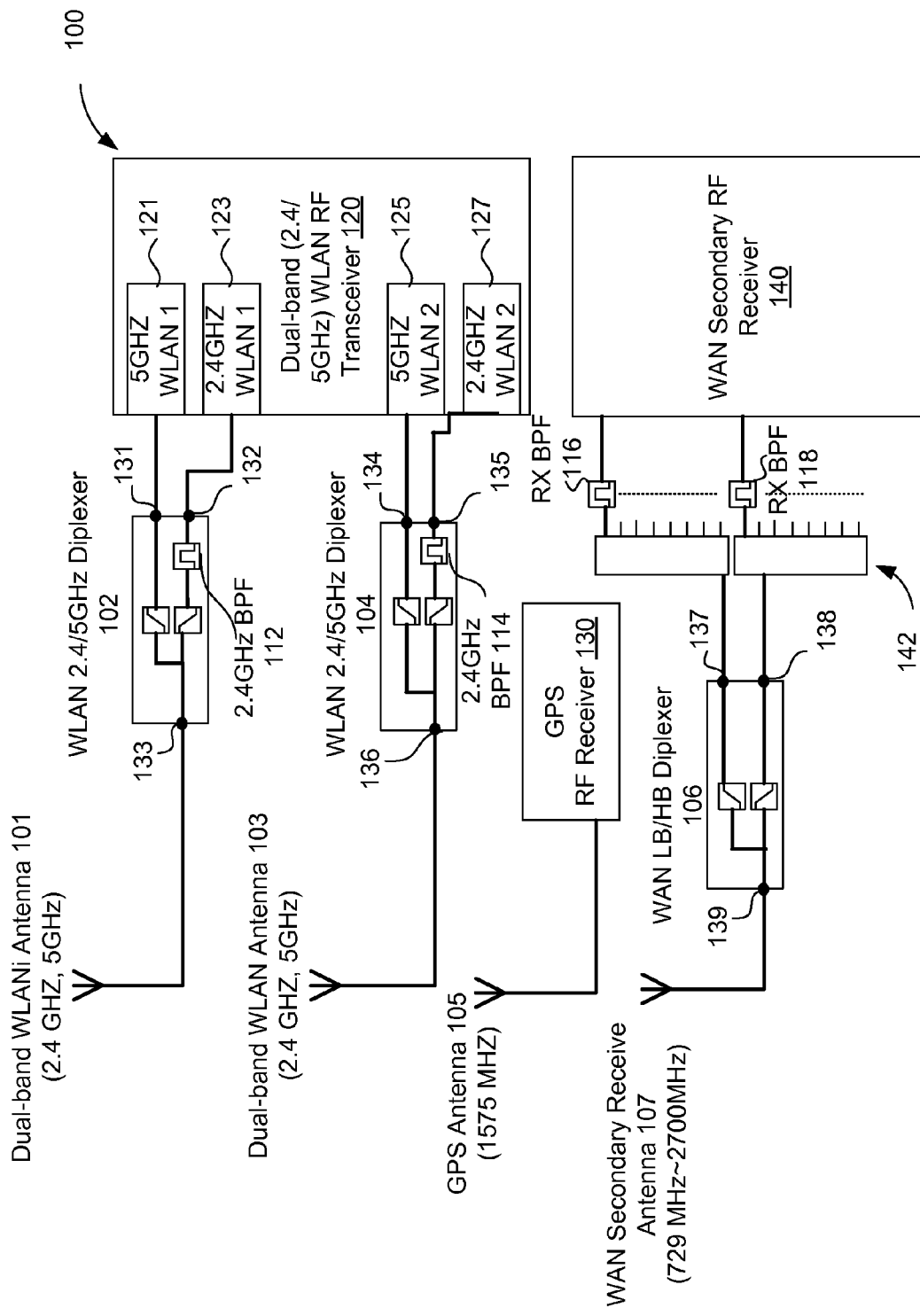
FIG. 1 is a block diagram of RF front-end circuitry coupled to four antennas for wireless local area network (WLAN), wide area network (WAN), and global positioning system (GPS) communications according to one implementation.

RF front-end circuitry and methods of operating the same are described. One apparatus includes multiple antenna terminals to couple to multiple antennas. The apparatus also includes a first RF transceiver, a second RF receiver, a third RF transceiver, and a RF circuit coupled between the antenna terminals and the first RF transceiver, the second RF receiver and the third RF transceiver. The first RF transceiver operates as a dual-band wireless local area network (WLAN) transceiver. The second RF receiver operates as a global positioning system (GPS) receiver and the third RF transceiver operates as a wide area network (WAN) receiver.

In another embodiment, an electronic device includes a first antenna, a second antenna, a third antenna and RF front-end circuitry. The RF front-end circuitry includes a first RF transceiver coupled to a first port and a second port of a first diplexer and coupled to a first port and a second port of a second diplexer. A third port of the first diplexer is coupled to a first port of a third diplexer. A third port of the third diplexer is coupled to the first antenna. A third port of the second diplexer is coupled to the second antenna. The RF front-end circuitry also includes a second RF receiver coupled to a second port of the third diplexer and a third RF receiver coupled to a first port and a second port of a fourth diplexer. A third port of the fourth diplexer is coupled to the third antenna. Diplexers, as used herein, are passive devices that implement frequency domain multiplexing. A diplexer includes first and second ports (e.g., L and H) that are multiplexed on a third port (e.g., S). The signals on the first and second ports occupy disjoint frequency bands. Consequently, the signals on the first port and second port can coexist on the third port without interfering with each other.

In another embodiment, an electronic device includes a first antenna, a second antenna, and RF front-end circuitry. The RF front-end circuitry includes a first RF transceiver coupled to a first port and a second port of a first diplexer and coupled to a first port of a second diplexer and coupled to a first port of the selection switch. A third port of the selection circuit is coupled to a second port of the second diplexer. A third port of the first diplexer is coupled to a first port of a third diplexer. A third port of the third diplexer is coupled to the first antenna. A third port of the second diplexer is coupled to the second antenna. The RF front-end circuitry also includes a second RF receiver coupled to a second port of the third diplexer and a third RF transceiver coupled to a first port and a second port of the fourth diplexer. A third port of the fourth diplexer is coupled to a second port of the selection circuit.

The electronic device (also referred to herein as user device) may be any content rendering device that includes a wireless modem for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, DVD players, media centers, and the like. The user device may connect to a network to obtain content from a server computing system (e.g., an item providing system) or to perform other activities. The user device may connect to one or more different types of cellular networks.

Figure 2:
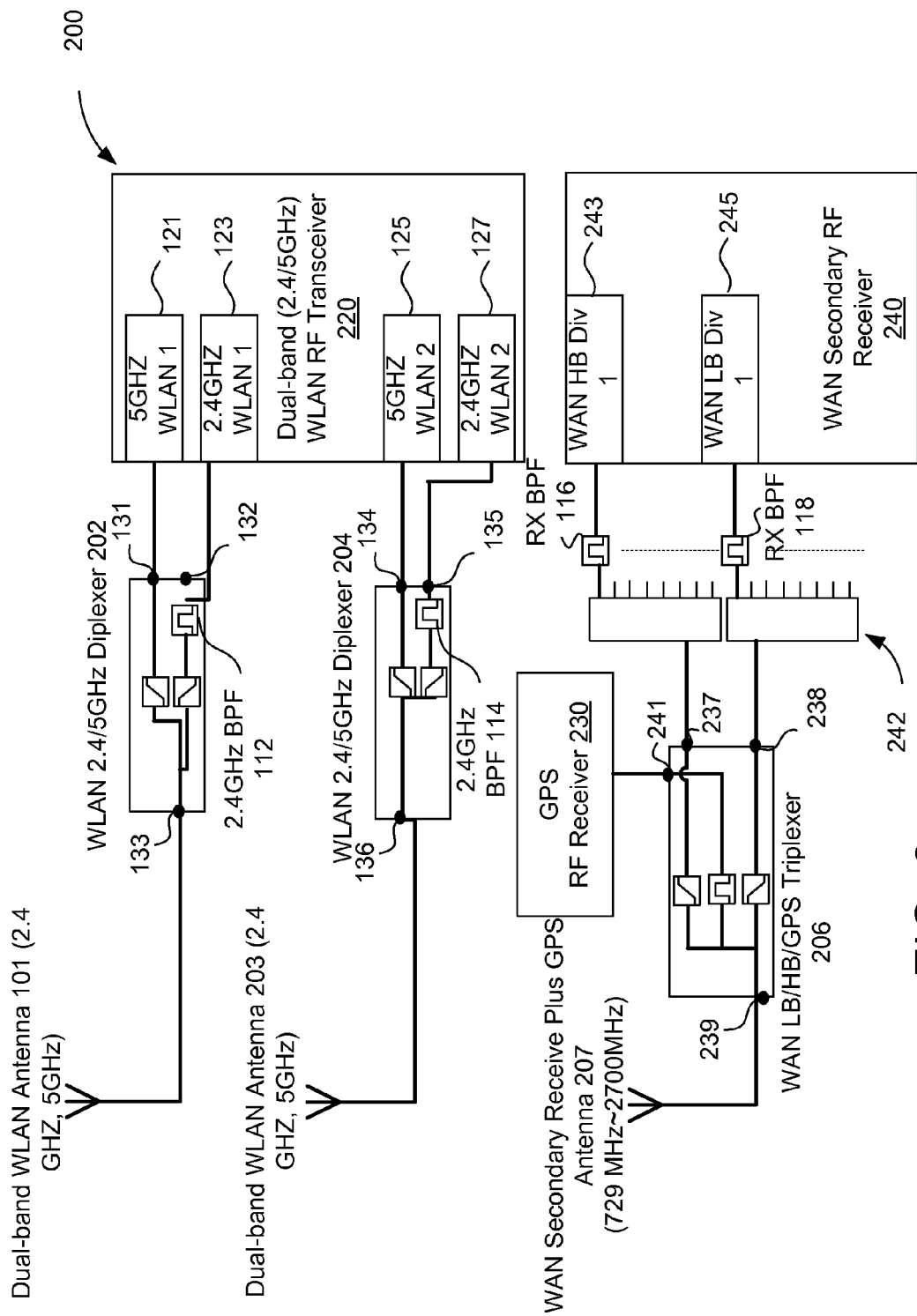
FIG. 2 is a block diagram of RF front-end circuitry coupled to three antennas for WLAN, WAN, and GPS communications according to another implementation.

In a constrained radiation space (low and thin profiles for mobile devices) of electronic device, antenna engineers face various challenges. For example, one problem facing antenna engineers is that WLAN (e.g., the Wi-Fi® technology) require two-by-two (2×) multiple-input, multiple-output (MIMO) antennas for MIMO operations for certain handheld electronic devices. Due to the space constraint, the addition of a second WLAN antenna is costly in materials and real estate within the electronic device. Another problem facing antenna engineers is designing an antenna that can be used in various antenna technologies across the globe. For example, Japan uses 1500 MHz (approximately 1428-1511 MHz) to service the 4G bands. This frequency range is too close to the GPS band (approximately 1575 MHz). Therefore, there is signal loss in 1500 MHz band when a GPS/WAN diplexer is used, leading to sensitivity degradation in the 1500 MHz band. As a result, conventional solutions use a dedicated GPS antenna to support simultaneous GPS and WAN diversity in 2×2 downlink MIMO without sensitivity degradation in the 1500 MHz band. The addition of the dedicated GPS antenna is costly in materials and real estate within the electronic device. FIG. 1 illustrates a dedicated GPS antenna for GPS communications and three other antennas for WLAN and WAN communications. FIG. 2 illustrates three antennas for GPS, WLAN and WAN communications using a triplexer for WAN high band, WAN low band and GPS. Triplexers, as used herein, are passive devices that implement frequency domain multiplexing. A triplexer includes first, second, and third ports that are multiplexed on a fourth port. The signals on the first, second and third ports occupy disjoint frequency bands. Consequently, the signals on the first port, second port and third port can coexist on the fourth port without interfering with each other.

FIG. 1 is a block diagram of RF front-end circuitry 100 coupled to four antennas 101-107 for WLAN, WAN and GPS communications according to one implementation. The RF front-end circuitry 100 includes a dual-band WLAN RF transceiver 120 for communications on the two Wi-Fi® bands, 2.4 GHz and 5 GHz, a GPS RF receiver 130 for communications on GPS band, approximately 1575 MHz, and a WAN secondary RF receiver 140 for communications on WAN bands, approximately 729 MHz~2700 MHz. It should be noted that the Wi-Fi® technology is the industry name for wireless local area network communication technology related to the IEEE 802.11 family of wireless networking standards by Wi-Fi Alliance. The dual-band WLAN RF transceiver 120 allows an electronic device to exchange data or connection to the Internet wireless using radio waves in the WLAN bands (2.4 GHz band, 5 GHz band) via the first dual-band WLAN antenna 101, the second dual-band WLAN antenna 103, or both. In particular, the dual-band WLAN RF transceiver 120 includes a 5 GHz WLAN channel 121 coupled to a first port 131 of a WLAN 2.4/5 GHz diplexer 102 (hereinafter diplexer 102) and a 2.4 GH WLAN channel 123 coupled to a second port 132 of the diplexer 102. A third port 133 of the diplexer 102 is coupled to the first dual-band WLAN antenna 101. The dual-band WLAN RF transceiver 120 also includes a 5 GHz WLAN channel 125 coupled to a first port 134 of a WLAN 2.4/5 GHz diplexer 104 (hereinafter diplexer 104) and a 2.4 GHz WLAN channel 127 coupled to a second port 135 of the diplexer 104. A third port 136 of the diplexer 104 is coupled to the second dual-band WLAN antenna 103.

The GPS RF receiver 130 allows the electronic device to receive data using radio waves in the GPS band (approximately 1575 MHz) via the dedicated GPS antenna 105. In particular, the GPS RF receiver 130 is coupled to a dedicated GPS antenna 105.

The WAN secondary RF receiver 140 allows the electronic device to receive data using radio waves in the WAN bands (approximately 729 MHz~2700 MHz) via the WAN secondary receive antenna 107. In particular, the WAN secondary RF receiver 140 is coupled to multiple receive channels of two selection circuits 142, where one selection circuit receives the WAN high band (HB), and the other selection circuit receives the WAN low band (LB). The selection circuits 142 are used to connect the WAN secondary receive antenna 107 to different receive (RX) channels used by the WAN secondary RF receiver 140 for different WAN frequency signals. In some embodiments, the selection circuits 142 may be multiplexers (MUX) that are controlled by a processor, the WAN secondary RF receiver 140, or the like, to select a signal path between one of the respective RX channels and the WAN secondary receiver antenna 107. The one selection circuit 142 is coupled to a first port 137 of a WAN LB/HB diplexer 106 (hereinafter diplexer 106) and the other selection circuit 142 is coupled to a second port 138 of the diplexer 106. A third port 139 of the diplexer 106 is coupled to the WAN secondary receive antenna 107.

Band pass filters (BPF) 112, 114, 116, and 118 may be used in connection with the diplexers 102, 104, 106 and the selection circuits 142. For example, BPF 112 may be a 2.4 GHz BPF between the diplexer 102 and the 2.4 GHz WLAN channel 123 of the dual-band WLAN RF transceiver 120. The BPF 114 may be a 2.4 GHz BPF between the diplexer 104 and the 2.4 GHz WLAN channel 127. The RX BPF 116 may be a BPF between one terminal of one selection circuit 142 and the WAN secondary RF receiver 140 and the RX BPF 118 may be a BPF between one terminal of the other selection circuit 142 and the WAN secondary RF receiver 140. Although not illustrated, additional RX BPF can be on each of the RX channels between the selection circuits 142 and the WAN secondary RF receiver 140.

The RF front-end circuitry 100 supports Wi-Fi® 2×2 MIMO and simultaneous GPS and WAN diversity/2×2 downlink MIMO. However, the RF front-end circuitry 100 uses four separate antennas for these wireless communications. The RF front-end circuitry can be modified to use three antennas, but the RF front-end circuitry needs a triplexer to support these wireless communications.

FIG. 2 is a block diagram of RF front-end circuitry 200 coupled to three antennas 101, 203, 207 for WLAN, WAN, and GPS communications according to another implementation. The RF front-end circuitry 200 is similar to the RF front-end circuitry 100 as noted by similar reference numbers, except where specifically noted. The RF front-end circuitry 200 includes the dual-band WLAN RF transceiver 220 as described above, a GPS RF receiver 230 and a WAN secondary RF receiver 240.

The GPS RF receiver 230 allows the electronic device to receive data using radio waves in the GPS band (approximately 1575 MHz) via the WAN secondary receive plus GPS antenna 207, instead of the dedicated GPS antenna 105. In particular, the GPS RF receiver 230 is coupled to a third port of a WAN LB/HB/GPS triplexer 206.

The WAN secondary RF receiver 240 allows the electronic device to receive data using radio waves in the WAN bands (approximately 729 MHz~2700 MHz) via the WAN secondary receive plus GPS antenna 207. In particular, the WAN secondary RF receiver 240 is coupled to multiple receive channels of two selection circuits 242, where one selection circuit receives the WAN HB and the other selection circuit receives the WAN LB. A first WAN HB receiver 243 of the WAN secondary RF receiver 240 is coupled to a first receive channel of the first selection circuit 242. The selection circuits 242 operate similar to the selection circuits 142 as described above to select the signal paths between the WAN secondary receive plus GPS antenna 207 and the WAN secondary receive RF receiver 240. The first selection circuit 242 is coupled to a first port of the WAN LB/HB/GPS triplexer 206 (hereinafter triplexer 206). A first WAN LB receiver 245 of the WAN secondary RF receiver 240 is coupled to a first receive channel of the second selection circuit 242. The second selection circuit 242 is coupled to a second port of the triplexer 206. A fourth port of the triplexer 206 is coupled to the WAN secondary receive plus GPS antenna 207.

The RF front-end circuitry 200 supports Wi-Fi® 2×2 MIMO and simultaneous GPS and WAN diversity/2×2 downlink MIMO. Although the RF front-end circuitry 200 uses three separate antennas for these wireless communications, the RF front-end circuitry 200 may have signal loss in 1500 MHz 4G WAN signal, which can result in failure to comply with operator requirements.

The embodiments described herein use RF front-end circuitry to provide an improved front-end architecture for wireless communication by electronic devices in WLAN, WAN, and GPS bands. In some embodiments, the GPS and WLAN antennas can be combined into three antennas. In some embodiments, three antennas are used to support the Dual-band Wi-Fi®, GPS and 4G WAN Receive bands. The three-antenna embodiments described herein may address the second problem described above facing antenna engineers without adding any dedicated antennas to the RF front-end architecture. In other embodiments, the GPS, WLAN and WAN antennas can be combined into two antennas. In some embodiments, the two antennas are used to support the Dual-band Wi-Fi®, GPS and 4G WAN Receive bands. In some two-antenna embodiments, an algorithm can be used to detect when Wi-Fi® 2×2 MIMO is needed, as described herein. The two-antenna embodiments described herein may address the first and second problems descried above facing antenna engineers, by reducing space constraints (reduces the number of antennas to two) and reducing signal loss in the 1500 MHz band.

Figure 3:
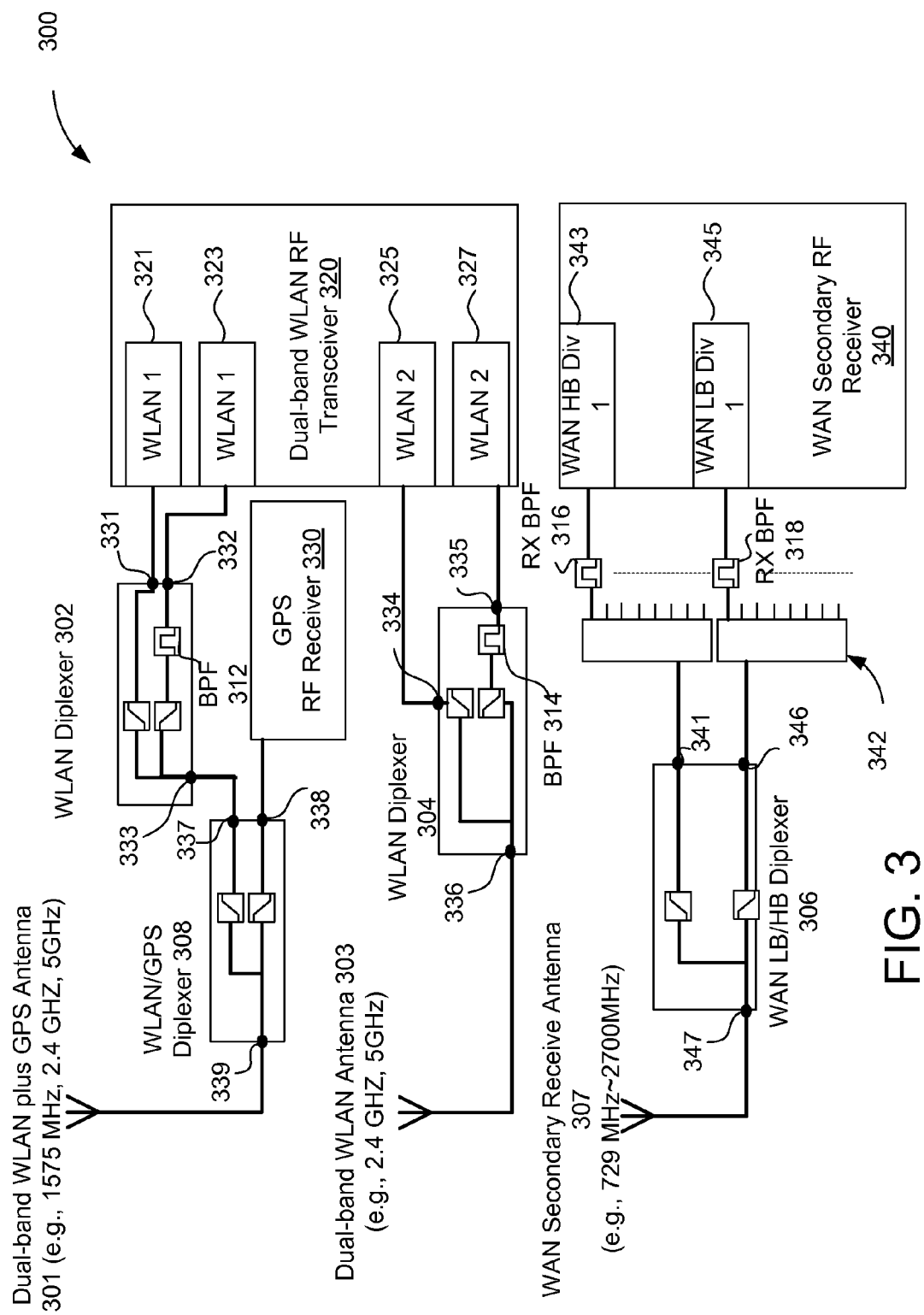
FIG. 3 is a block diagram of RF front-end circuitry coupled to three antennas for WLAN, WAN, and GPS communications according to one embodiment.

In one embodiment, the RF front-end circuitry includes multiple antenna terminals to couple to multiple antennas. The apparatus also includes a first RF transceiver, a second RF receiver, a third RF transceiver, and a RF circuit coupled between the antenna terminals and the first RF transceiver, the second RF receiver and the third RF transceiver. The first RF transceiver operates as a dual-band WLAN transceiver. The second RF receiver operates as a GPS receiver and the third RF transceiver operates as a WAN receiver. In one embodiment, the RF front-end circuitry is coupled to three antennas as illustrated in FIG. 3. In another embodiment, the RF front-end circuitry is coupled to two antennas as illustrated in FIG. 2.

FIG. 3 is a block diagram of RF front-end circuitry 300 coupled to three antennas 301, 303, 307 for WLAN, WAN, and GPS communications according to one embodiment. The RF front-end circuitry 300 includes a dual-band WLAN RF transceiver 320 for communications on the two WLAN bands (e.g., 2.4 GHz band and 5 GHz band), a GPS RF receiver 330 for communications on GPS band (e.g., approximately 1575 MHz), and a WAN secondary RF receiver 340 for communications on WAN bands (e.g., approximately 729 MHz~2700 MHz). Although the depicted embodiments and various embodiments describe the WAN secondary RF receiver, a WAN RF transceiver can be used for the receive operations described herein. That is the WAN secondary RF receiver may actually be a transceiver that can perform both receive operations and transmit operations, even if only used for receive operations as described with respect to the WAN secondary RF receiver described herein. In one embodiment, the WLAN bands are the Wi-Fi® bands, 2.4 GHz and 5 GHz. The dual-band WLAN RF transceiver 320 allows an electronic device to exchange data or connection to the Internet wireless using radio waves in the WLAN bands (2.4 GHz, 5 GHz) via the first dual-band WLAN plus GPS antenna 301, the second dual-band WLAN antenna 303, or both. In particular, the dual-band WLAN RF transceiver 320 includes a first WLAN channel 321 (e.g., for 5 GHz band) coupled to a first port 331 of a WLAN diplexer 302 and a second WLAN channel 323 (e.g., for 2.4 GHz band) coupled to a second port 332 of the WLAN diplexer 302. A third port 333 of the WLAN diplexer 302 is coupled to a first port 337 of a WLAN/GPS diplexer 308. A third port 339 of the WLAN/GPS diplexer 308 is coupled to the first dual-band WLAN plus GPS antenna 301. The dual-band WLAN RF transceiver 320 also includes a third WLAN channel 325 (e.g., for 5 GHz band) coupled to a first port 334 of a WLAN diplexer 304 and a fourth WLAN channel 327 (e.g., for 2.4 GHz band) coupled to a second port 335 of the WLAN diplexer 304. A third port 336 of the WLAN diplexer 304 is coupled to the second dual-band WLAN antenna 303. The WLAN diplexer 302 separates WLAN signals in a first WLAN frequency band from the WLAN signals in a second WLAN frequency band for the dual-band WLAN RF transceiver 320. The WLAN/GPS diplexer 308 separates the WLAN signals for the WLAN RF transceiver 320 from GPS signals for the GPS RF receiver 330. The WLAN diplexer 304 separates the WLAN signals in the first WLAN frequency band from the WLAN signals in a second WLAN frequency band for the dual-band WLAN RF transceiver 320.

The GPS RF receiver 330 allows the electronic device to receive data using radio waves in the GPS band (approximately 1575 MHz) via the dual-band WLAN plus GPS antenna 301, instead of the dedicated GPS antenna 105. In particular, the GPS RF receiver 330 is coupled to a second port 338 of the WLAN/GPS diplexer 308. As described above, the third port 339 of the WLAN/GPS diplexer 308 is coupled to the dual-band WLAN plus GPS antenna 301.

The WAN secondary RF receiver 340 allows the electronic device to receive data using radio waves in the WAN bands (approximately 729 MHz~2700 MHz) via the WAN secondary receive antenna 307. In particular, the WAN secondary RF receiver 340 is coupled to multiple receive channels of two selection circuits 342, where one selection circuit receives the WAN HB and the other selection circuit receives the WAN LB. The selection circuits 342 operate similar to the selection circuits 142 as described above to select the signal paths between the WAN secondary receive antenna 307 and the WAN secondary receive RF receiver 340. The one selection circuit 342 is coupled to a first port 341 of a WAN LB/HB diplexer 306 and the other selection circuit 342 is coupled to a second port 346 of the WAN LB/HB diplexer 306. A third port 347 of the WAN LB/HB diplexer 306 is coupled to the WAN secondary receive antenna 307. The WAN LB/HB diplexer 306 separates the WAN signals in a first WAN frequency band from the WAN signals in a second WAN frequency band for the WAN secondary receive RF receiver 340.

In some embodiments, band pass filters (BPF) 312, 314, 316, and 318 may be used in connection with the WLAN diplexers 302, 304, and WLAN LB/HB diplexer 306 and the selection circuits 342. For example, BPF 312 may be a 2.4 GHz BPF between the WLAN diplexer 302 and the WLAN channel 323 of the dual-band WLAN RF transceiver 320. The BPF 314 may be a 2.4 GHz BPF between the WLAN diplexer 304 and the WLAN channel 327. The RX BPF 316 may be a BPF between one terminal of one selection circuit 342 and the WAN secondary RF receiver 340 and the RX BPF 318 may be a BPF between one terminal of the other selection circuit 342 and the WAN secondary RF receiver 340. Although not illustrated, additional RX BPF can be on each of the RX channels between the selection circuits 342 and the WAN secondary RF receiver 340.

The RF front-end circuitry 300 supports Wi-Fi® 2×2 MIMO and simultaneous GPS and WAN diversity/2×2 downlink MIMO. Unlike the RF front-end circuitry 100 of FIG. 1 that uses four separate antennas for these wireless communications, the RF front-end circuitry 300 uses three antennas and does not use a triplexer to support these wireless communications like the RF front-end circuitry 200 of FIG. 2.

In another embodiment, an electronic device includes a first antenna, a second antenna, a third antenna and RF front-end circuitry. The RF front-end circuitry includes a first RF transceiver coupled to a first port and a second port of a first diplexer and coupled to a first port and a second port of a second diplexer. A third port of the first diplexer is coupled to a first port of a third diplexer. A third port of the third diplexer is coupled to the first antenna. A third port of the second diplexer is coupled to the second antenna. The RF front-end circuitry also includes a second RF receiver coupled to a second port of the third diplexer and a third RF transceiver coupled to a first port and a second port of a fourth diplexer. A third port of the fourth diplexer is coupled to the third antenna.

Figure 4:
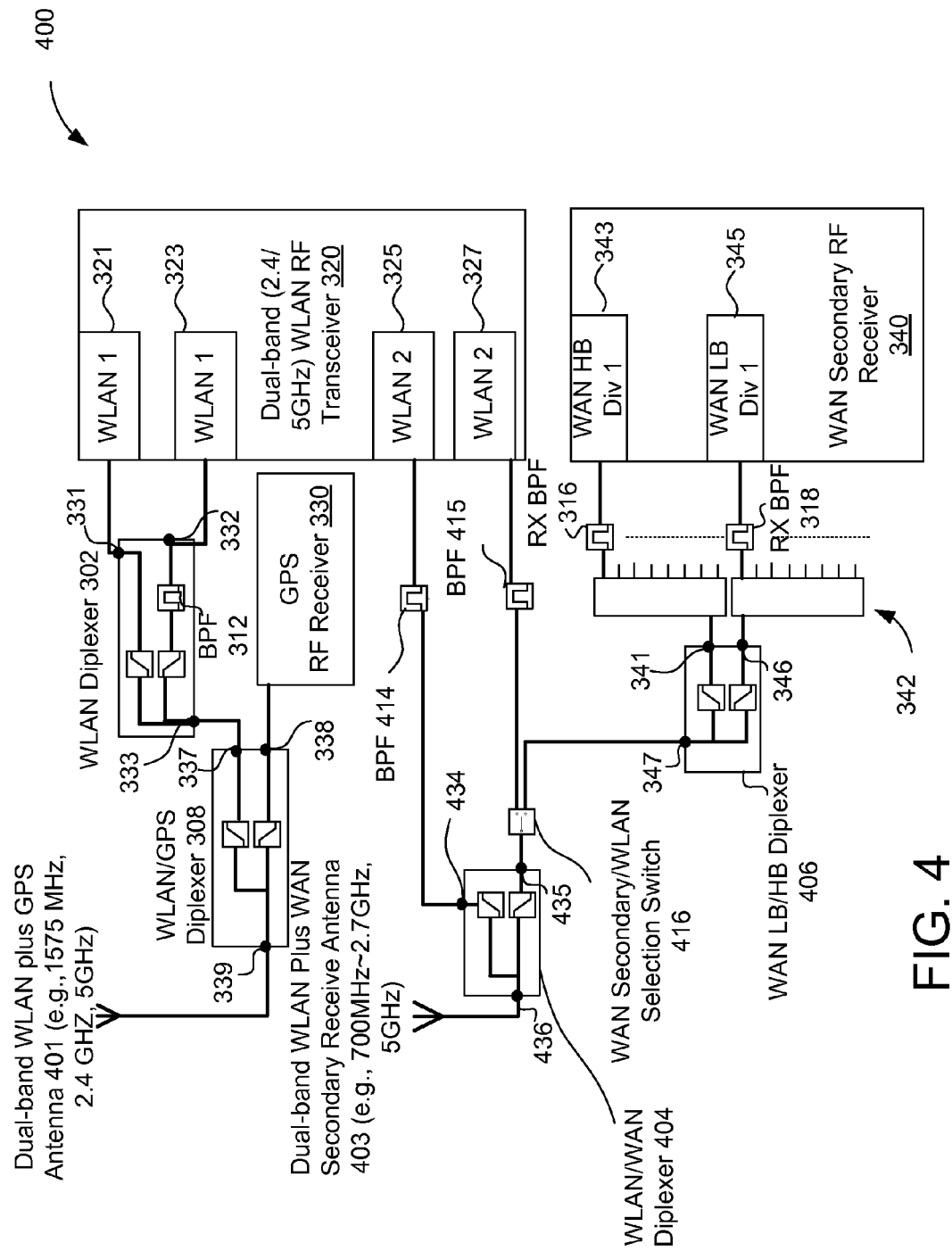
FIG. 4. is a block diagram of RF front-end circuitry coupled to two antennas for WLAN, WAN, and GPS communications according to one embodiment.

FIG. 4. is a block diagram of RF front-end circuitry 400 coupled to two antennas 401, 403 for WLAN, WAN, and GPS communications according to one embodiment. The RF front-end circuitry 400 is similar to RF front-end circuitry 300 as noted by similar reference numbers except where specifically noted. The RF front-end circuitry 400 includes a dual-band WLAN RF transceiver 320 for communications on the two WLAN bands (e.g., 2.4 GHz band and 5 GHz band), the GPS RF receiver 330 for communications on GPS band (e.g., approximately 1575 MHz), and the WAN secondary RF receiver 340 for communications on WAN bands (e.g., approximately 729 MHz~2700 MHz). In one embodiment, the WLAN bands are the Wi-Fi® bands, 2.4 GHz band and 5 GHz band. The dual-band WLAN RF transceiver 320 allows an electronic device to exchange data or connection to the Internet wireless using radio waves in the WLAN bands (2.4 GHz, 5 GHz bands) via the first dual-band WLAN plus GPS antenna 401, the second dual-band WLAN plus WAN secondary receive antenna 403, or both. In particular, the dual-band WLAN RF transceiver 320 includes a first WLAN channel 321 (e.g., for 5 GHz band) coupled to a first port 331 of a WLAN diplexer 302 and a second WLAN channel 323 (e.g., for 2.4 GHz band) coupled to a second port 332 of the WLAN diplexer 302. A third port 333 of the WLAN diplexer 302 is coupled to a first port 337 of a WLAN/GPS diplexer 308. A third port 339 of the WLAN/GPS diplexer 308 is coupled to the first dual-band WLAN plus GPS antenna 401. The dual-band WLAN RF transceiver 320 also includes a third WLAN channel 325 (e.g., for 5 GHz band) coupled to a first port 434 of a WLAN/WAN diplexer 404 and a fourth WLAN channel 327 (e.g., for 2.4 GHz band) coupled to a first port of a WAN secondary/WLAN selection switch 416. A third port of the WAN secondary/WLAN selection switch 416 is coupled to a second port 435 of the WLAN/WAN diplexer 404. A third port 346 of the WLAN/WAN diplexer 404 is coupled to the second dual-band WLAN plus WAN secondary receive antenna 403. Unlike the RF front-end circuitry 300 of FIG. 3 where the third WLAN channel 325 and fourth WLAN channel 327 are coupled to the dual-band WLAN antenna 303, the third WLAN channel 325 and fourth WLAN channel 327 of FIG. 4 are coupled to the second dual-band WLAN plus WAN secondary receive antenna 403, which is also coupled to the WAN secondary RF receiver 340. This reduces the number of antennas to two antennas to support the same frequency bands as the three antennas in FIG. 3. The WLAN/WAN diplexer 404 separates the WLAN signals in the first WLAN frequency band from the WLAN signals in a second WLAN frequency band for the dual-band WLAN RF transceiver 320 and WAN signals for the WAN secondary receive RF receiver 340. The WAN secondary/WLAN selection switch 416 is controlled by a processing component to select between a WAN secondary mode and a WLAN mode. In the WAN secondary mode, the WAN secondary/WLAN selection switch 416 creates a signal path between the second dual-band WLAN plus WAN secondary receive antenna 403 and the WAN secondary RF receiver for WAN signals. In the WLAN mode, the WAN secondary/WLAN selection switch 416 creates a signal path between the second dual-band WLAN plus WAN secondary receive antenna 403 and the dual-band WLAN RF transceiver 320 for WLAN signals.

The GPS RF receiver 430 allows the electronic device to receive data using radio waves in the GPS band (approximately 1575 MHz) via the dual-band WLAN plus GPS antenna 401, instead of the dedicated GPS antenna 105. In particular, the GPS RF receiver 430 is coupled to a second port 338 of the WLAN/GPS diplexer 308. As described above, the third port 339 of the WLAN/GPS diplexer 308 is coupled to the dual-band WLAN plus GPS antenna 401.

The WAN secondary RF receiver 340 allows the electronic device to receive data using radio waves in the WAN bands (approximately 729 MHz~2700 MHz) via the second dual-band WLAN plus WAN secondary receive antenna 403. In particular, the WAN secondary RF receiver 340 is coupled to multiple receive channels of two selection circuits 342, where one selection circuit receives the WAN HB, and the other selection circuit receives the WAN LB. The selection circuits 342 operate similar to the selection circuits described herein to select the signal paths between the dual-band WLAN plus WAN secondary receive antenna 403 and the WAN secondary receive RF receiver 340. The one selection circuit 342 is coupled to a first port 341 of a WAN LB/HB diplexer 406, and the other selection circuit 342 is coupled to a second port 346 of the WAN LB/HB diplexer 406. A third port 347 of the WAN LB/HB diplexer 406 is coupled to a second port of the WAN secondary/WLAN selection switch 416. As described above, the third port of the WAN secondary/WLAN selection switch 416 is coupled to the second port 435 of the WLAN/WAN diplexer 404. The third port 436 of the WLAN/WAN diplexer 404 is coupled to the second dual-band WLAN plus WAN secondary receive antenna 403. The WAN LB/HB diplexer 406 separates WAN signals in a first WAN frequency band from the WAN signals in a second WAN frequency band for the WAN secondary receive RF receiver 340.

In some embodiments, BPFs 312, 414, 415, 316 and 318 may be used in connection with the WLAN diplexer 302, WLAN/WAN diplexer 404, and WLAN LB/HB diplexer 406 and the selection circuits 342. The BPF 312, 316 and 318 are described above with respect to FIG. 3. The BPF 414 may be a 5 GHz BPF between the WLAN/WAN diplexer 404 and the WLAN channel 325. The BPF 318 may be a 2.4 GHz BPF between the WAN secondary/WAN selection switch 416 and the WLAN channel 327.

The RF front-end circuitry 400 supports Wi-Fi® 2×2 MIMO and simultaneous GPS and WAN diversity/2×2 downlink MIMO. The RF front-end circuitry 400 may not support some use cases, such as not supporting Wi-Fi® 2×2 MIMO in 2.4 GHZ in a hotspot mode as described in more detail below. In some embodiments, the RF front-end circuitry 400 includes multiple modes of operation and an algorithm can be used to switch between the modes. In one embodiment, the algorithm detects when Wi-Fi® 2×2 MIMO is needed, as described in more detail below. Unlike the RF front-end circuitry 100 of FIG. 1, the RF front-end circuitry 200 of FIG. 2, and RF front-end circuitry 300 of FIG. 3, the RF front-end circuitry 400 uses two antennas for the wireless communications in WLAN, GPS and WAN frequency bands. Also, the RF front-end circuitry 400 does not use a triplexer to support these wireless communications like the RF front-end circuitry 200 of FIG. 2. The two-antenna embodiments described herein may address the first and second problems descried above facing antenna engineers, by reducing space constraints (reduces the number of antennas to two) and reducing signal loss in the 1500 MHz band.

In one embodiment, in the first mode, the dual-band WLAN RF transceiver 320, GPS RF receiver 330, dual-band WLAN plus GPS antenna 401 and dual-band WLAN plus WAN secondary receive antenna 403 allow concurrent WLAN MIMO operations and GPS operations. In the second mode, the dual-band WLAN RF transceiver 320, GPS RF receiver 330, WAN secondary RF receiver 340, dual-band WLAN plus GPS antenna 401 and dual-band WLAN plus WAN secondary receive antenna 403 allow concurrent WLAN single-input, single-output (SISO) operations and the GPS operations with the first antenna, and WAN operations with the second antenna. The WLAN MIMO operations are performed in a first WLAN frequency band (e.g., centered at approximately 2.4 GHz) and a second WLAN frequency band (e.g., centered at approximately 5 GHz). The GPS operations are performed in a GPS frequency band (e.g., centered at approximately 1575 MHz). The WAN operations are performed in a WAN frequency band (e.g., centered at approximately 1511 MHz).

In another embodiment, an electronic device includes a first antenna, a second antenna, and RF front-end circuitry. The RF front-end circuitry includes a first RF transceiver coupled to a first port and a second port of a first diplexer and coupled to a first port of a second diplexer and coupled to a first port of the selection switch. A third port of the selection circuit is coupled to a second port of the second diplexer. A third port of the first diplexer is coupled to a first port of a third diplexer. A third port of the third diplexer is coupled to the first antenna. A third port of the second diplexer is coupled to the second antenna. The RF front-end circuitry also includes a second RF receiver coupled to a second port of the third diplexer and a third RF transceiver coupled to a first port and a second port of the fourth diplexer. A third port of the fourth diplexer is coupled to a second port of the selection circuit.

Method 500, 600, 700, and 800 may be performed by processing logic that may comprise hardware (e.g., circuitry, dedicated logic, programmable logic, microcode, etc.), software (such as instructions running on a processor), firmware or a combination thereof. In one embodiment, a user device 905 of FIG. 9 performs methods 500, 600, 700, and 800. In another embodiment, a user device 1005 of FIG. 10 performs the methods 500, 600, 700, and 800. In another embodiment, a processing element of an electronic device can perform the methods 500, 600, 700, and 800. Alternatively, other components of a computing system may perform some or all of the operations of the methods 500, 600, 700, and 800.

Figure 5:
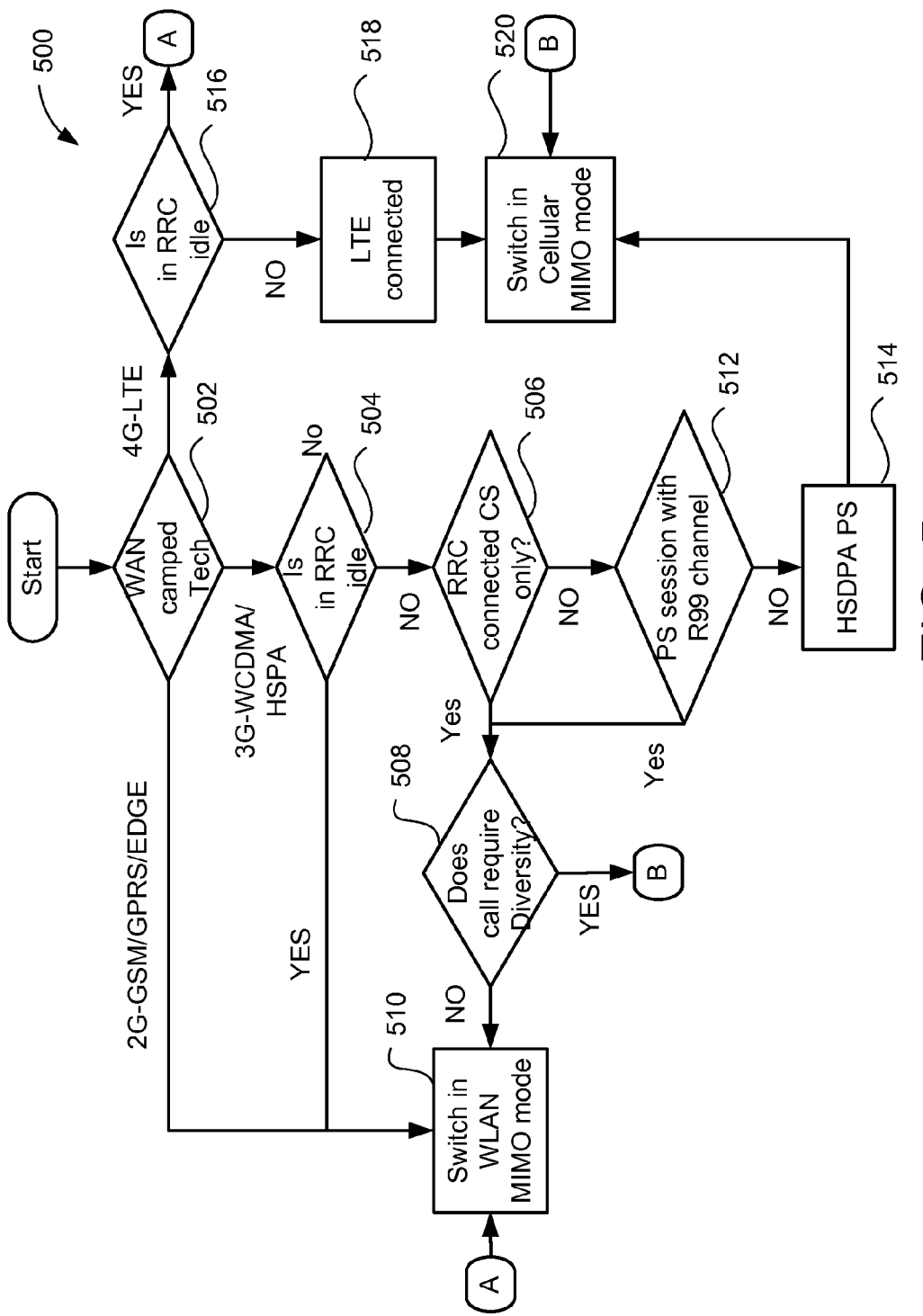
FIG. 5 is a flow diagram of a method of switching between a first mode and a second mode of the RF front-end circuitry of FIG. 4 according to one embodiment.

FIG. 5 is a flow diagram of a method of switching between a first mode and a second mode of the RF front-end circuitry of FIG. 4 according to one embodiment. The method 500 begins by the processing logic determines which WAN technology the user device is currently using to communicate (block 502). For example, the WAN technology may be any one of 4G-LTE, 3G-WCDMA/HSPA, or 2G-GSM/GPRS/EDGE. When the WAN transceiver uses 2G-GSM/GPRS/EDGE, the processing logic switches into a WLAN MIMO mode (block 510). When the WAN transceiver uses 3G-WCDMA/HSPA, the processing logic determines if the user device is in a radio resource control (RRC) idle mode (no connection) (block 504). If in the RRC idle mode, the processing logic switches into the WLAN MIMO mode (block 510). However, if not in the RRC idle mode at block 504, the processing logic determines if the RRC connected mode is only in circuit switched (CS) mode (CS only) (block 506). If the RRC is connected CS only, the processing logic determines if a communication (e.g., data communication or phone communication, such as a phone call) requires diversity for which the first antenna and second antenna are needed for the communication (block 508). Antenna diversity is a communication scheme that uses two or more antennas to improve the quality, reliability, or both of a wireless link. When communicating with some antenna radio technologies, the specification may indicate when diversity is required, such as when communicating certain types of data. Alternatively, the user device can specify the conditions when diversity should be used or not for communications. If the communication does not require diversity, the processing logic switches into the WLAN MIMO mode (block 510); otherwise, the processing logic switches into cellular MIMO mode (block 520). If at block 506 the processing logic determines that RRC is not connected in CS only, the processing logic determines a current packet switched (PS) session is with R99 channel (3GPP Release 99) (block 512). If yes, the processing logic returns to block 508 to determine whether the communication requires diversity. However, if the PS session is not with the R99 channel, the processing logic is in HSDPA PS at block 514 and switches into the cellular MIMO mode (block 520).

When the WAN transceiver uses 4G-LTE, the processing logic determines the processing logic determines if the user device is in RRC idle mode (no connection) (block 516). If so, the processing logic switches into WLAN MIMO mode (block 510). If the user device is not in RRC idle mode at block 516, the processing logic determines that the user device is in LTE connected (block 518) and switches into the cellular MIMO mode (block 520).

Figure 6:
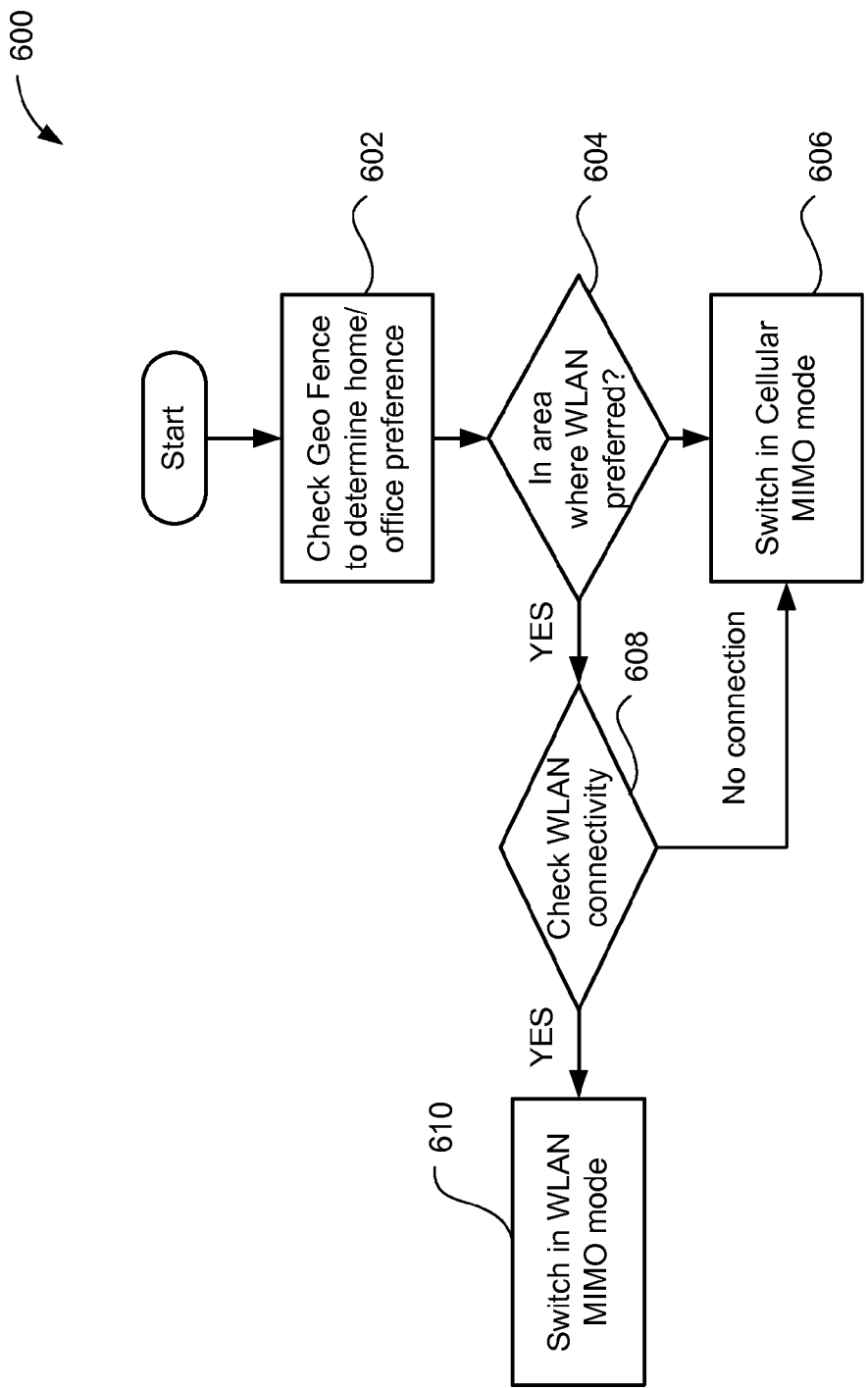
FIG. 6 is a flow diagram of a method of switching between a first mode and a second mode of the RF front-end circuitry of FIG. 4 according to one embodiment.

FIG. 6 is a flow diagram of a method 600 of switching between a first mode and a second mode of the RF front-end circuitry of FIG. 4 according to one embodiment. The method 600 begins by the processing logic checking a geo-fence (virtual perimeter for a real-word geographic area) to determine a specified location, such as a home area or work area (block 602). The specified location may be a user-specified location or may be a location that is learned adaptively by the processing logic. The processing logic determines whether the user device is in a defined area where WLAN is preferred (block 604) (e.g., WLAN has a higher priority ranking than WAN in this area). For example, the WLAN communication may have a higher priority ranking than the WAN communication in the defined area. The priority rankings may specify a preference order for communications by the user device when the user device is connected to a WLAN and a WAN and the user device is located in the defined area. If so, the processing logic checks for WLAN connectivity (block 608). The processing logic determines whether the user device is connected to the WLAN. If there is WLAN connectivity (e.g., user device is connected to the WLAN), the processing logic switches into WLAN MIMO mode (block 610). However, if the user device is not in the area where WLAN is preferred at block 604 or there is no WLAN connectivity at block 608, the processing logic switches into cellular MIMO mode (block 606).

Figure 7:
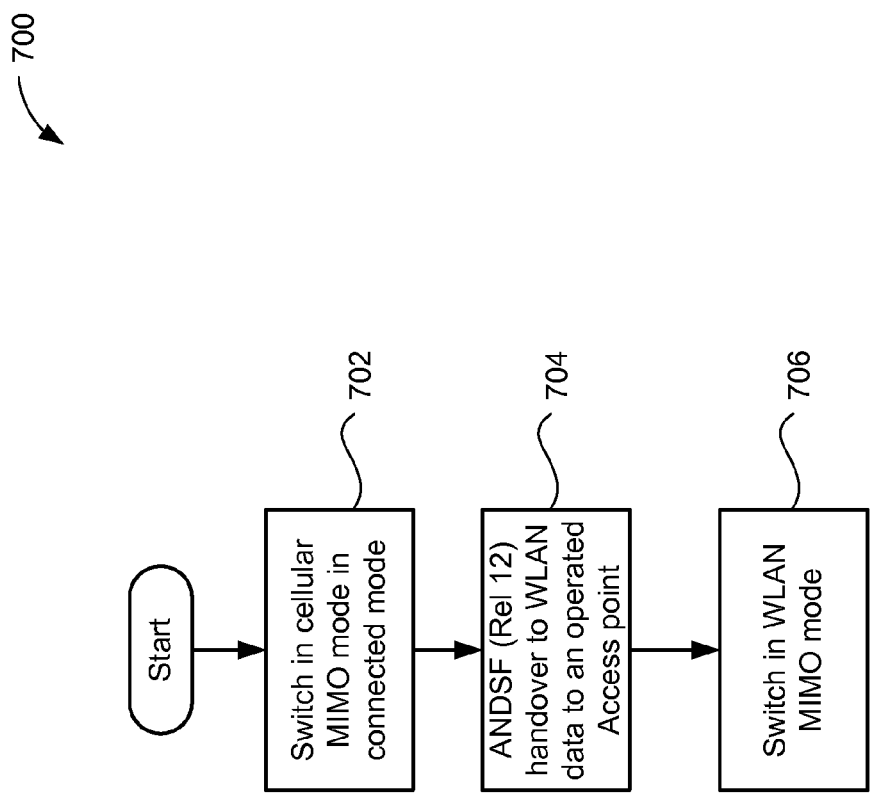
FIG. 7 is a flow diagram of a method of switching between a first mode and a second mode of the RF front-end circuitry of FIG. 4 according to one embodiment.

FIG. 7 is a flow diagram of a method 700 of switching between a first mode and a second mode of the RF front-end circuitry of FIG. 4 according to one embodiment. The method 700 begins by the processing logic switching into a cellular MIMO mode (block 702). While in the cellular MIMO mode, the processing logic determines if a "handover" from a WAN connection to a WLAN connection has occurred (block 704).

For example, the processing logic may determine that data transfers by the WAN connection between the user device and a cellular node (e.g., a base station) have been switched to data transfers by a WLAN connection between the user device and an access point (AP). For example, Access Network Discovery and Selection Function (ANDSF) (3GPP release 12) can handover WLAN data to an access point when available. In this case, the processing logic switches into WLAN MIMO mode (block 706).

Figure 8:
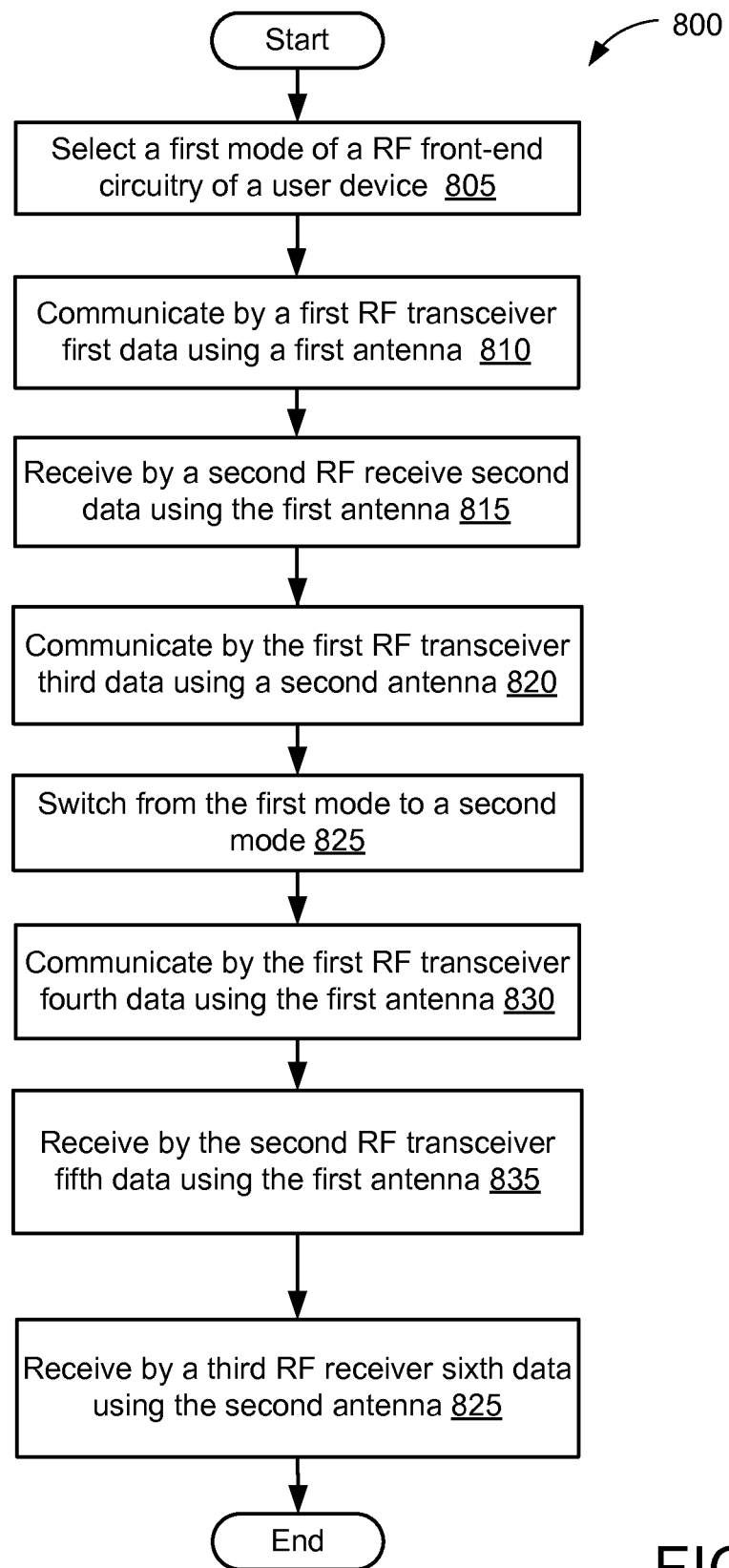
FIG. 8 is a flow diagram of a method of operating RF front-end circuitry according to one embodiment.

FIG. 8 is a flow diagram of a method 800 of operating RF front-end circuitry according to one embodiment. The method 800 begins by the processing logic selecting a first mode of a RF front-end circuitry of a user device (block 805). In the first mode, the processing logic communicates by a first RF transceiver of the user device, first data using a first antenna of the user device (block 810). Also, in the first mode, the processing logic receives, by a second RF receiver, second data using the first antenna (block 815). The second data can be received concurrently while the first data is communicated (transmitted or received). Also, in the first mode, the processing logic communicates, by the first RF transceiver, third data using a second antenna (block 820). At block 825, the processing logic switches from the first mode to a second mode of the RF front-end circuitry. In the second mode, the processing logic communicates, by the first RF transceiver, fourth data using the first antenna (block 830) and the processing logic receives, by the second RF receiver, fifth data using the first antenna (block 835). The fifth data can be received concurrently while the fourth data is communicated (transmitted or received). Also, in the second mode, the processing logic receives, by a third RF transceiver, sixth data using the second antenna. (block 840).

In one embodiment, the first RF transceiver is a first dual-band wireless local area network (WLAN) transceiver, the second RF receiver is a global positioning system (GPS) receiver, and the third RF transceiver is a wide area network (WAN) secondary RF receiver. Alternatively, other types of transceivers may be used in connection with the two antennas for wireless communications in WLAN, GPS and WAN frequency bands.

In a further embodiment, the switching between modes includes determining whether a WAN connection is idle or connected and determining whether a call (or other communication) using the connected WAN connection requires diversity. The processing logic switches into the first mode when the call (or other communication) does not require diversity or the WAN connection is idle and switches into the second mode when the call (or other communication) requires diversity or the WAN connection is connected.

In a further embodiment, the switching between modes includes determining whether the user device is located if in a defined area where WLAN communication is preferred. For example, a geo-fence can be used to define the area where WLAN communication is preferred. The geo-fence can be specified by a user or may be adaptively learned by the user device. The processing logic also determines if there is WLAN connectivity. The processing logic switches into the second mode when the user device is not located within the defined area or there is no WLAN connectivity. The processing logic switches into the first mode when the user device is located within the defined area and there is WLAN connectivity.

In a further embodiment, the switching between modes includes determining that WLAN data is handed over to an operated access point from a WAN connection and switching to the first mode when the WLAN data is handed over to the operated access point.

In the embodiments described above, the first mode may be the WLAN MIMO mode and the second mode may be the cellular MIMO mode, as described above with respect to FIGS. 5-7.

It should be noted that the antennas described herein can be designed to cover multiple bands, such as the eight-band LTE/GSM/UMTS, the GSM850/900/1800/1900/UMTS penta-band operation, or the LTE700/GSM850/900 (698-960 MHz) and GSM 1800/190/UMTS/LTE2300/2500 (1710-2690 MHz operation. In the user device context, the purpose of doing so is to support roaming between different regions whose infrastructure cannot support mobile services in the same frequency range. These frequency bands may be Universal Mobile Telecommunication Systems (UMTS) frequency bands, GSM frequency bands, or other frequency bands used in different communication technologies, such as, for example, cellular digital packet data (CDPD), general packet radio service (GPRS), enhanced data rates for GSM evolution (EDGE), 1 times radio transmission technology (1×RTT), evaluation data optimized (EVDO), high-speed downlink packet access (HSDPA), WiFi, WiMax, etc. In other embodiments, the RF front-end circuitry can be used in various target bands, such as, for examples: 1) Verizon LTE band: 746 to 787 MHz; 2) US 850 (band 5): 824 to 894 MHz; 3) GSM900 (band 8): 880 to 960 MHz; 4) GSM 1800/DCS: 1.71 to 1.88 GHz; 5) US1900/PCS (band 2): 1.85 to 1.99 GHz; and 6) WCDMA band I (band 1): 1.92 to 2.17 GHz.

Figure 9:
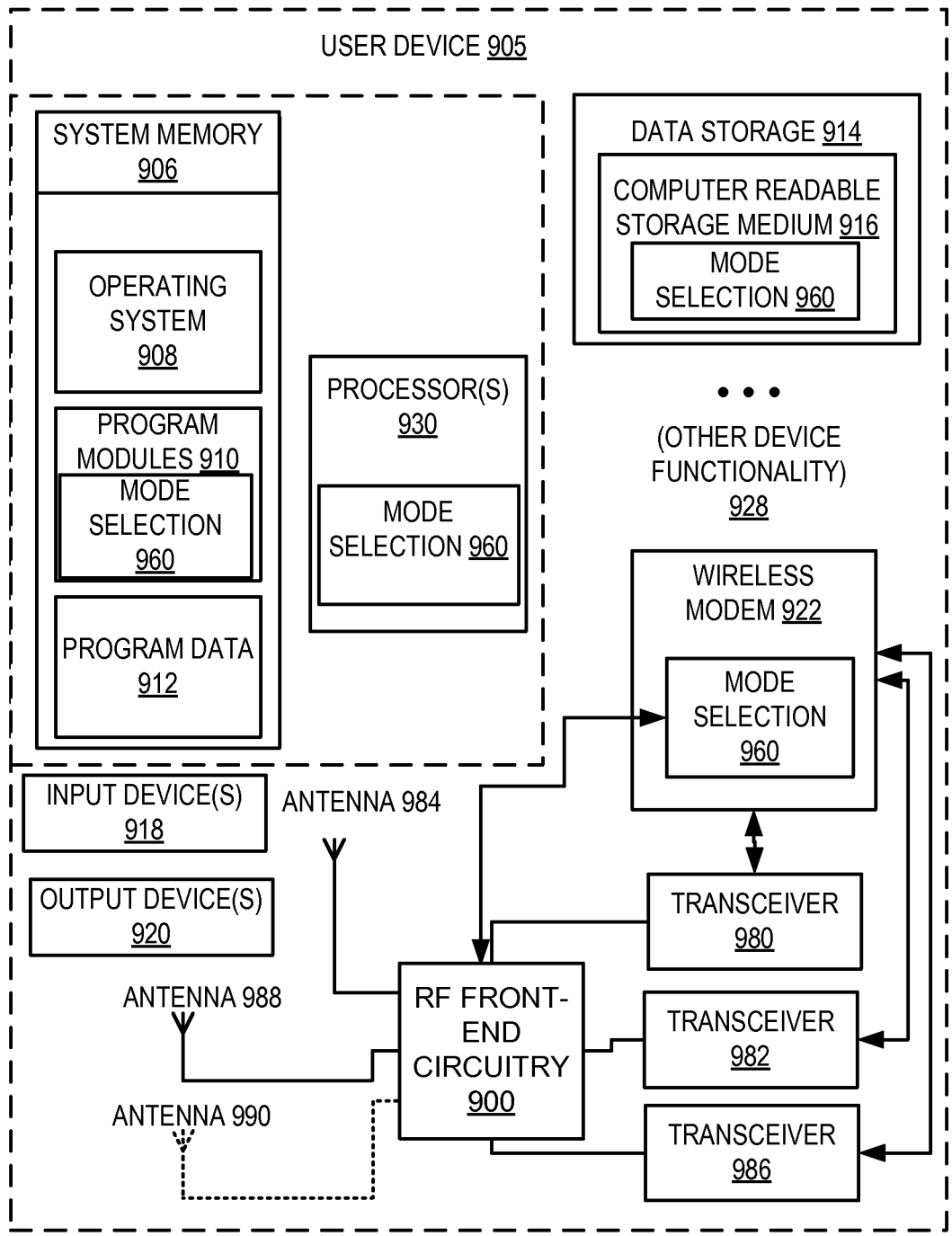
FIG. 9 is a block diagram illustrating one embodiment of an exemplary user device including RF front-end circuitry and mode selection.

FIG. 9 is a block diagram illustrating one embodiment of an exemplary user device 905 including RF front-end circuitry 900 and mode selection 960. The user device 905 may correspond to the user device 1005 of FIG. 10 and may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The RF front-end circuitry 900 may be the RF front-end circuitry 300 or RF front-end circuitry 400 as described above. In the case of RF front-end circuitry 300, the mode selection 960 may be optional.

The user device 905 includes one or more processor(s) 930, such as one or more CPUs, microcontrollers, field programmable gate arrays, or other types of processors. The user device 905 also includes system memory 906, which may correspond to any combination of volatile and/or non-volatile storage mechanisms. The system memory 906 stores information that provides operating system component 908, various program modules 910 such as mode selection 960, program data 912, and/or other components. The user device 905 performs functions by using the processor(s) 930 to execute instructions provided by the system memory 906.

The user device 905 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. As shown, instructions for the mode selection 960 may reside, completely or at least partially, within the computer-readable storage medium 916, system memory 906 and/or within the processor(s) 930 during execution thereof by the user device 905, the system memory 906 and the processor(s) 930 also constituting computer-readable media. The user device 905 may also include one or more input devices 918 (keyboard, mouse device, specialized selection keys, etc.) and one or more output devices 920 (displays, printers, audio output mechanisms, etc.).

The user device 905 further includes a wireless modem 922 to allow the user device 905 to communicate via a wireless network (e.g., such as provided by the wireless communication system) with other computing devices, such as remote computers, an item providing system, and so forth. The wireless modem 922 allows the user device 905 to handle both voice and non-voice communications (such as communications for text messages, multimedia messages, media downloads, web browsing, etc.) with the wireless communication system 1010 (or 1012) of FIG. 10. The wireless modem 922 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc. In one embodiment, the wireless modem includes the mode selection 960 in addition to, or instead of, the mode selection 960 being included in the computer-readable storage medium 916, system memory 906 and/or processor(s) 930. The mode selection 960 may be implemented as hardware, firmware and/or software of the wireless modem 922. It should be noted that the wireless modem 922 may include a processing component that performs various operations to handle both voice and non-voice communications. This processing component can execute the mode selection 960. Alternatively, a processing component of the user device, such as the processor(s) 930 or other types of processing device can execute the mode selection 960.

The wireless modem 922 may generate signals and send these signals to transceiver 980, transceiver 982 or transceiver 986 for amplification, after which they are wirelessly transmitted via antenna 984, antenna 988, or optional antenna 990 (in the case of three antennas of FIG. 3), respectively. The transceivers 980, 982, 986 may be the dual-band WLAN transceivers, GPS receivers, or WAN receivers as described herein. Antennas 984, 988, 990 may be configured to transmit in different frequency bands and/or using different wireless communication protocols. The antennas 984, 988, and optional antenna 990 may be directional, omnidirectional, or non-directional antennas. In addition to sending data, antennas 984, 988, and optional antenna 990 also receive data, which is sent to wireless modem 922 and transferred to processor(s) 930. The mode selection 960 (such as in the two antenna embodiments) can instruct a selection switch (e.g., WAN secondary/WLAN selection switch 416) of the RF-front-end circuitry 900 to switch to the first mode (e.g., WLAN MIMO mode) or to the second mode (e.g., cellular MIMO mode), as described herein. It should also be noted that the transceivers 980, 982, 986 may be part of the RF front-end circuitry 900 (although illustrated as separate components).

Though a single wireless modem 922 is shown to control transmission to both antennas 984 and 988, the user device 905 may alternatively include multiple wireless modems, each of which is configured to transmit data via a different antenna and/or wireless transmission protocol.

Figure 10:
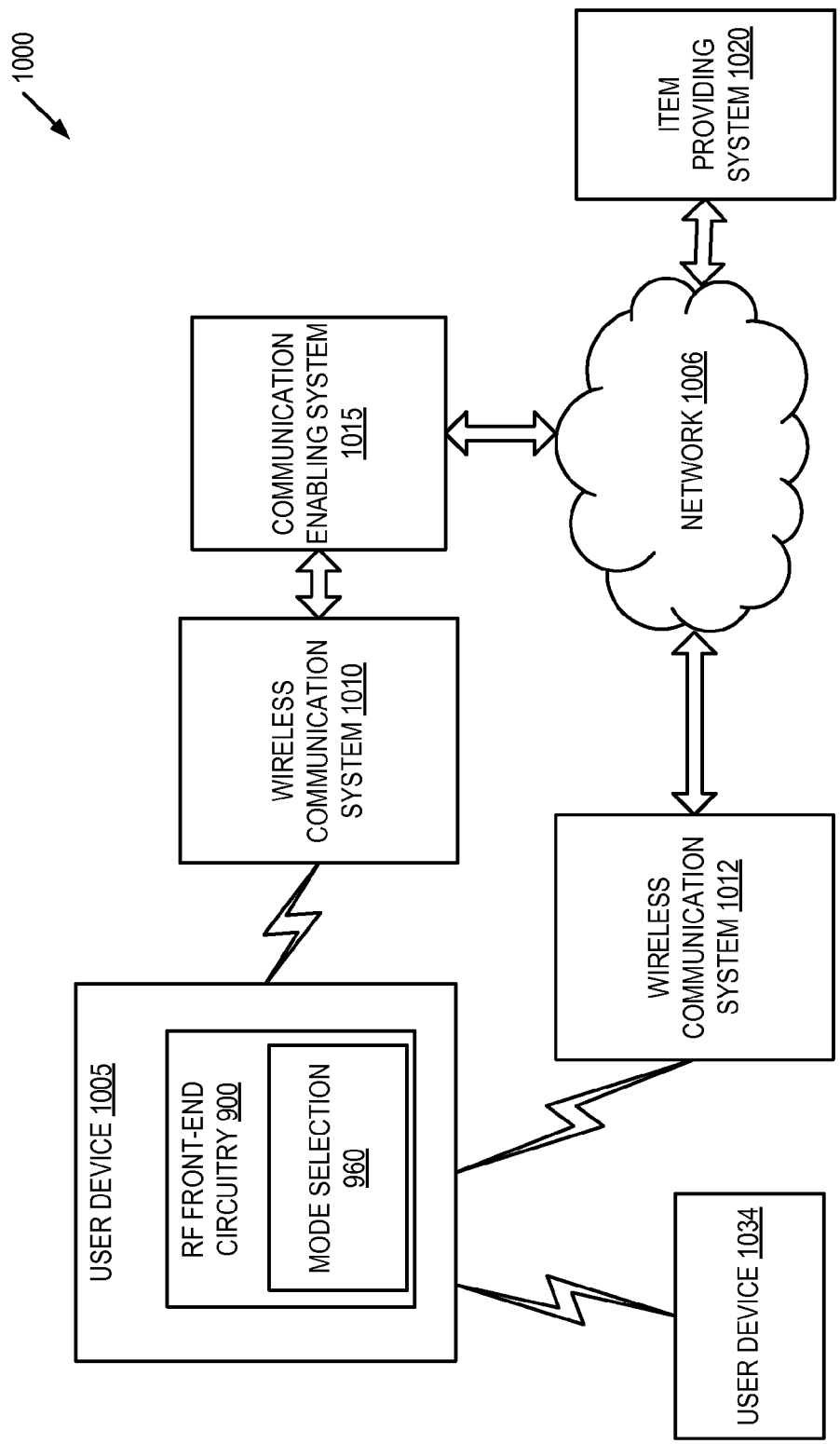
FIG. 10 is a block diagram of an exemplary network architecture in which embodiments of RF front-end circuitry may operate.

FIG. 10 is a block diagram of an exemplary network architecture 1000 in which embodiments of RF front-end circuitry may operate. The network architecture 1000 may include an item providing system 1020 and one or more user devices 1005 capable of communicating with the item providing system 1020 via a network 1006 (e.g., public network such as the Internet or private network such as a local area network (LAN)). The user device 1005 includes the RF front-end circuitry 900 as described herein.

The user devices 1005 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1005 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 1020 and the user devices 1005 deliver and/or receive items, upgrades, and/or other information via the network 1006. For example, the user devices 1005 may download or receive items from the item providing system 1020. The item providing system 1020 also receives various requests, instructions and other data from the user devices 1005 via the network 1006. The item providing system 1020 may include one or more machines (e.g., one or more server computer systems, routers, gateways, etc.) that have processing and storage capabilities to provide the above functionality.

Communication between the item providing system 1020 and the user device 1005 may be enabled via any communication infrastructure. One example of such an infrastructure includes a combination of a wide area network (WAN) and wireless infrastructure, which allows a user to use the user device 1005 to purchase items and consume items without being tethered to the item providing system 1020 via hard-wired links. The wireless infrastructure may be provided by one or multiple wireless communications systems, such as wireless communications system 1010 and wireless communication system 1012. One of the wireless communication systems 1010, 1012 may be a Wi-Fi® hotspot connected with the network 1006. Another of the wireless communication systems 1010, 1012 may be a wireless carrier system that can be implemented using various data processing equipment, communication towers, etc. Alternatively or additionally, the wireless carrier system may rely on satellite technology to exchange information with the user device 1005.

The communication infrastructure may also include a communication-enabling system 1015 that serves as an intermediary in passing information between the item providing system 1020 and the wireless communication system 1010. The communication-enabling system 1015 may communicate with the wireless communication system 1010 (e.g., a wireless carrier) via a dedicated channel, and may communicate with the item providing system 1020 via a non-dedicated communication mechanism, e.g., a public Wide Area Network (WAN) such as the Internet.

In one embodiment, while the user device 1005 is connected with the wireless communication system 1010 and/or wireless communication system 1012, the wireless communication system periodically or continuously specifies transmit power levels for the user device 1005 to use for transmissions to that wireless communication system 1010, 1012. For example, conventional wireless carrier systems dictate what transmit power levels mobile phones are to use for communications with the wireless carrier systems. The transmit power levels that the wireless carrier systems specify continuously vary based on environmental factors such as a current signal to noise ratio, distance between the mobile phone and a nearest cell tower, obstacles between the mobile phone and the nearest cell tower, and so on.

In addition to wirelessly connecting to a wireless communication system 1010, 1012, the user device 1005 may also wirelessly connect with other user devices (e.g., user device 1005). For example, user device 1005 may form a wireless ad hoc (peer-to-peer) network with user device 1005. In addition to controlling the transmit power levels used to communicate with the wireless communication systems 1010, 1012, the transmit power manager 1035 may also control the transmit power used to communicate with other user devices 1034.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
   a first antenna, wherein the first antenna is a dual-band wireless local area network (WLAN) and global positioning system (GPS) antenna;
   a second antenna, wherein the second antenna is a dual-band WLAN and wide area network (WAN) antenna; and
   radio frequency (RF) front-end circuitry, wherein the RF front-end circuitry comprises:
      a first diplexer comprising first, second and third ports, wherein the first diplexer multiplexes the first and second ports of the first diplexer onto the third port of the first diplexer;
      a second diplexer comprising first, second and third ports, the third port of the second diplexer being coupled to the first antenna, wherein the second diplexer multiplexes the first and second ports of the second diplexer onto the third port of the second diplexer;
      a third diplexer comprising first, second and third ports, the third port of the third diplexer being coupled to the second antenna, wherein the third diplexer multiplexes the first and second ports of the third diplexer onto the third port of the third diplexer;
      a selection switch;
      a dual-band WLAN RF transceiver coupled to the first and second ports of the first diplexer and coupled to the first port of the second diplexer and the selection switch, wherein the first diplexer separates WLAN signals in a first WLAN frequency band from the WLAN signals in a second WLAN frequency band for the dual-band WLAN RF transceiver and the first antenna;
      a GPS RF receiver coupled to the second port of the third diplexer, wherein the third diplexer separates the WLAN signals for the dual-band WLAN RF transceiver from GPS signals for the GPS RF receiver; and
      a WAN RF receiver coupled to the selection switch, wherein the selection switch selectively couples the dual-band WLAN RF transceiver or the WAN RF receiver to the second antenna, wherein the second diplexer separates the WLAN signals in a first WLAN frequency band from the WLAN signals in the second WLAN frequency band for the dual-band WLAN RF transceiver and the second antenna and WAN signals for the WAN RF receiver, and wherein the selection switch selects a first mode to create a first signal path between the second antenna and the dual-band WLAN RF transceiver or selects a second mode to create a second signal path between the second antenna and the WAN RF receiver.

2. The electronic device of claim 1, wherein the RF front-end circuitry further comprises a fourth diplexer comprising first, second and third ports, the third port of the fourth diplexer being coupled to the selection switch and the first and second ports of the fourth diplexer being coupled to the WAN RF receiver, wherein the fourth diplexer separates the WAN signals in a first WAN frequency band from the WAN signals in a second WAN frequency band for the WAN RF receiver.

3. The electronic device of claim 1, wherein the first antenna and the second antenna support multiple-input, multiple-output (MIMO) operations when the selection switch selectively couples the second antenna to the dual-band WLAN RF transceiver in the first mode.

4. An electronic device comprising:
a first antenna;
a second antenna; and
radio frequency (RF) front-end circuitry, wherein the RF front-end circuitry comprises:
a selection switch coupled to the second antenna;
a first RF transceiver coupled to the first antenna and selectively coupled to the second antenna via the selection switch;
a second RF receiver coupled to the first antenna, wherein the first antenna receives signals for the first RF transceiver and the second RF receiver;
a third RF transceiver coupled to the second antenna via the selection switch, wherein the selection switch selectively couples the second antenna to the first RF transceiver in a first mode of the RF front-end circuitry and selectively couples the second antenna to the third RF transceiver in a second mode of the RF front-end circuitry;
a first diplexer comprising:
a first port coupled to the first RF transceiver;
a second port coupled to the first RF transceiver; and
a third port, wherein the first diplexer separates signals in a first frequency band from the signals in a second frequency band associated with the first RF transceiver;
a second diplexer comprising:
a first port coupled to the first RF transceiver;
a second port coupled to the selection switch; and
a third port coupled to the second antenna; and
a third diplexer comprising:
a first port coupled to the third port of the first diplexer;
a second port coupled to the second RF receiver; and
a third port coupled to the first antenna, wherein the third diplexer separates the signals associated with the first RF transceiver from the signals associated with the second RF receiver, wherein the second diplexer separates the signals associated with the first RF transceiver from signals associated with the third RF transceiver, wherein the selection switch selects the first mode to create a first signal path between the second antenna and the first RF transceiver or selects the second mode to create a second signal path between the second antenna and the third RF transceiver.

5. The electronic device of claim 4, wherein the RF front-end circuitry further comprises a fourth diplexer comprising:
a first port coupled to the third RF transceiver;
a second port coupled to the third RF transceiver; and
a third port coupled to the selection switch, wherein the fourth diplexer separates the signals in a first frequency band associated with the third RF transceiver from the signals in a second frequency band associated with the third RF transceiver.

6. The electronic device of claim 5, wherein the RF front-end circuitry further comprises:
a first selection circuit coupled between the first port of the fourth diplexer and a first plurality of receive channels of the third RF transceiver, wherein the first selection circuit selects a first signal path between one of the first plurality of receive channels of the third RF transceiver and the first port of the fourth diplexer; and
a second selection circuit coupled between the second port of the fourth diplexer and a second plurality of receive channels of the third RF transceiver, wherein the second selection circuit selects a second signal path between one of the second plurality of receive channels of the third RF receive and the second port of the fourth diplexer.

7. The electronic device of claim 4, wherein the RF front-end circuitry supports two-by-two multiple-input, multiple-output (MIMO) operations in the first mode with the first antenna and second antenna.

8. The electronic device of claim 7, wherein the RF front-end circuitry supports global positioning system (GPS) operations in the first mode with the first antenna.

9. The electronic device of claim 4, wherein the RF front-end circuitry supports global positioning system (GPS) operations and wireless local area network (WLAN) operations with the first antenna, and supports wide area network (WAN) operations in the second mode with the second antenna.

10. The electronic device of claim 4, wherein:
in the first mode, the first RF transceiver, the second RF receiver, the first antenna and second antenna allow concurrent wireless local area network (WLAN) multiple-input, multiple-output (MIMO) operations and global positioning system (GPS) operations; and
in the second mode, the first RF transceiver, the second RF receiver, the third RF transceiver, the first antenna and the second antenna allow concurrent WLAN single-input, single-output (SISO) operations and the GPS operations with the first antenna, and wide area network (WAN) operations with the second antenna.

11. The electronic device of claim 10, wherein the WLAN MIMO operations are performed in a first WLAN frequency band and a second WLAN frequency band, wherein the first WLAN frequency band is centered at approximately 2.4 GHz and the second WLAN frequency band is centered at approximately 5 GHz.

12. The electronic device of claim 10, wherein the GPS operations are performed in a GPS frequency band and the WAN operations are performed in a WAN frequency band, wherein the GPS frequency band is centered at approximately 1575 MHz, wherein the WAN frequency band is between approximately 1428 MHz and approximately 1511 MHz.

13. The electronic device of claim 4, wherein the first RF transceiver is a dual-band wireless RF transceiver, the second RF receiver is a global positioning system (GPS) receiver and the third RF transceiver is a wide area network (WAN) secondary RF receiver, wherein the first antenna operates as a first dual-band wireless local area network (WLAN) antenna and a GPS antenna, and wherein the second antenna operates as a second dual-band WLAN antenna in the first mode and as a WAN antenna in the second mode.

14. The electronic device of claim 13, wherein the first dual-band WLAN antenna and the second dual-band WLAN antenna support multiple-input, multiple-output (MIMO) operations.

15. The electronic device of claim 4, wherein the RF front-end circuitry supports two-by-two multiple-input, multiple-output (MIMO) operations in the first mode with the first antenna and second antenna, and wherein the RF front-end circuitry supports global positioning system (GPS) operations in the first mode with the first antenna.

* * * * *